United States Patent [19]

Crossland et al.

[11] Patent Number: 4,574,282
[45] Date of Patent: Mar. 4, 1986

[54] COHERENT LIGHT IMAGE GENERATION

[75] Inventors: William A. Crossland, Harlow; Jack R. Peters, Dunmow; Peter W. Ross; Peter J. Ayliffe, both of Bishop's Stortford, all of England

[73] Assignee: International Standard Electric Corporation, New York, N.Y.

[21] Appl. No.: 476,649

[22] Filed: Mar. 18, 1983

[51] Int. Cl.$^4$ .............................................. G09G 3/36
[52] U.S. Cl. ..................... 340/784; 340/719; 340/805; 340/794; 350/333
[58] Field of Search .............. 340/784, 713, 718, 719, 340/805, 794, 795; 350/331, 332, 333, 350 R, 350 S

[56]         References Cited
         U.S. PATENT DOCUMENTS

| | | | |
|---|---|---|---|
| 3,744,878 | 7/1973 | Kiemle | 340/784 |
| 3,750,136 | 7/1973 | Roess | 340/784 |
| 3,862,360 | 1/1975 | Dill et al. | 340/784 |
| 3,865,975 | 2/1975 | Fletcher et al. | 340/794 |
| 4,349,817 | 9/1982 | Hoffman et al. | 340/784 |
| 4,391,492 | 7/1983 | Lu et al. | 340/784 |
| 4,395,709 | 7/1983 | Nagae et al. | 340/784 |
| 4,403,217 | 9/1983 | Becker et al. | 340/784 |
| 4,408,201 | 10/1983 | Harada | 340/784 |
| 4,432,610 | 2/1984 | Kobayashi et al. | 340/784 |
| 4,456,910 | 6/1984 | DiMassimo et al. | 340/784 |
| 4,499,458 | 2/1985 | Le Berre et al. | 340/784 |

FOREIGN PATENT DOCUMENTS 2042238A  2/1980  United Kingdom .

Primary Examiner—Marshall M. Curtis
Attorney, Agent, or Firm—T. L. Peterson; J. M. May

[57]                    ABSTRACT

A coherent light image generator for signal processing such as image correlation directs laser light onto a specularly reflecting matrix addressed dyed nematic liquid crystal display device having a liquid crystal layer sandwiched between a transparent electroded front plate and an active single crystal silicon wafer incorporating NMOS circuitry.

12 Claims, 6 Drawing Figures

COHERENT LIGHT IMAGE GENERATION

BACKGROUND OF THE INVENTION

This invention relates to the generation of coherent light images, and finds application in electro-optic signal processing, such as radio frequency spectrum analysis, image correlation, or synthetic aperture radar.

In a typical electro-optic signal processor two or more signals are compared by a correlation process involving the superimposing of the Fourier transform of a first coherent light image upon a second, or upon a hologram that is derived from, or models, the Fourier transform of a second coherent light image. This may be used for instance to form an image correlation for identifying the presence and location of a particular object in the field of view of a television camera. A correlator of this type is described in a paper entitled "Coherent Optical Processing: Another Approach" by B. D. Guenther et al., IEEE Journal of Quantum Electronics, Vol. QE-15 No. 12 pp. 1348-62 (December 1979), and in a paper entitled "Real-Time Optical Correlation with Solid-State Sources" by J. G. Duthie et al., Society of Photo-Optical Instrumentation Engineers, Vol. 231, 1980 International Optical Computing Conference (1980) pp. 281-90. In the apparatus described in these papers the generation of a coherent light image relies upon generating a non-coherent light image by means of a cathode ray tube and projecting this image onto a liquid crystal 'light valve'. The light valve is illuminated with coherent light from a laser, and provides a spatial polarization modulation of the reflected beam according to the spatial modulation of the incoherent light image projected onto its rear face. A polarization analyzer then converts this polarization modulation into intensity modulation. Experience with this known arrangement has shown that the use of the cathode ray tube is disadvantageous for several reasons, one of them being the generation of high-energy radiation by the cathode ray tube, and another being certain image distortion resulting from the indirect method of obtaining the image.

SUMMARY OF THE INVENTION

Accordingly, it is a general object of the present invention to avoid the disadvantages of the prior art.

More particularly, it is an object of the present invention to provide an arrangement for generating coherent light images, which does not possess the disadvantages of the known arrangements of this type.

Still another object of the present invention is so to construct the arrangement of the present invention as to achieve a more direct way of forming the image than before.

It is a concomitant object of the present invention so to design the arrangement of the above type as to be relatively simple in construction, inexpensive to manufacture, easy to use, and reliable in operation nevertheless.

In pursuance of these objects and others which will become apparent hereafter, one feature of the present invention resides in a coherent light image generating arrangement comprising means for generating a coherent light image, including at least one reflective mode liquid crystal display cell having a liquid crystal layer that is sandwiched between an electroded transparent front plate and a backing plate which includes a semiconductor layer provided with a matrix array of semiconductor gates and a matrix array of reflective electrodes situated at the liquid crystal layer to define respective picture elements in the latter and individually connected to the gates to be addressed thereby, and a laser operative for directing coherent radiation on the reflective mode liquid crystal display cell; and means for driving the generating means, including a drive circuitry connected with the gates and operative for so processing an input video signal as to modulate the optical properties of selected ones of the picture elements in dependence on their positions by developing a selected electric field distribution between the electroded front plate and the individual electrodes of the backing plate in accordance with the information contents of the input video signal.

The present invention is thus concerned with an alternative and more direct method of producing a coherent light image by a method not requiring a liquid crystal layer to be backed by a cathode ray tube. The modulation produced by the liquid crystal layer may be the same kind of modulation as referred to above in which birefringence effects are employed to produce polarization modulation, or alternatively the liquid crystal layer incorporates a pleochroic dye so that amplitude modulation may be produced directly.

The invention also provides an electro-optic signal processor incorporating an image generator as defined above, which processor is adapted to form a coherent light image of a video signal applied thereto and superimpose the Fourier transform of that image on a holographic filter, or on the Fourier transform of a second coherent light image.

The invention further provides a coherent light optical correlator in which the presence and location of a particular 'target' object in the field of view of a television camera is identified by cross-correlation produced by using an image generator as defined above to form a coherent light image of that field of view and superimposing a Fourier transform of that image either on a hologram of that particular 'target' object or a model thereof, or on a Fourier transform of a coherent light image of that object or model.

The replacement of the hologram with the Fourier transform of the output of a second coherent light image generator enables the non-mechanical substitution of one target template for another merely by changing the video signal applied to the second image generator.

BRIEF DESCRIPTION OF THE DRAWING

The above-mentioned and other features and objects of the invention will become more apparent by reference to the following description taken in conjunction with the accompanying drawing in which.

DETAILED DESCRIPTION OF THE PREFERRED EMBODIMENTS

Figure 1:
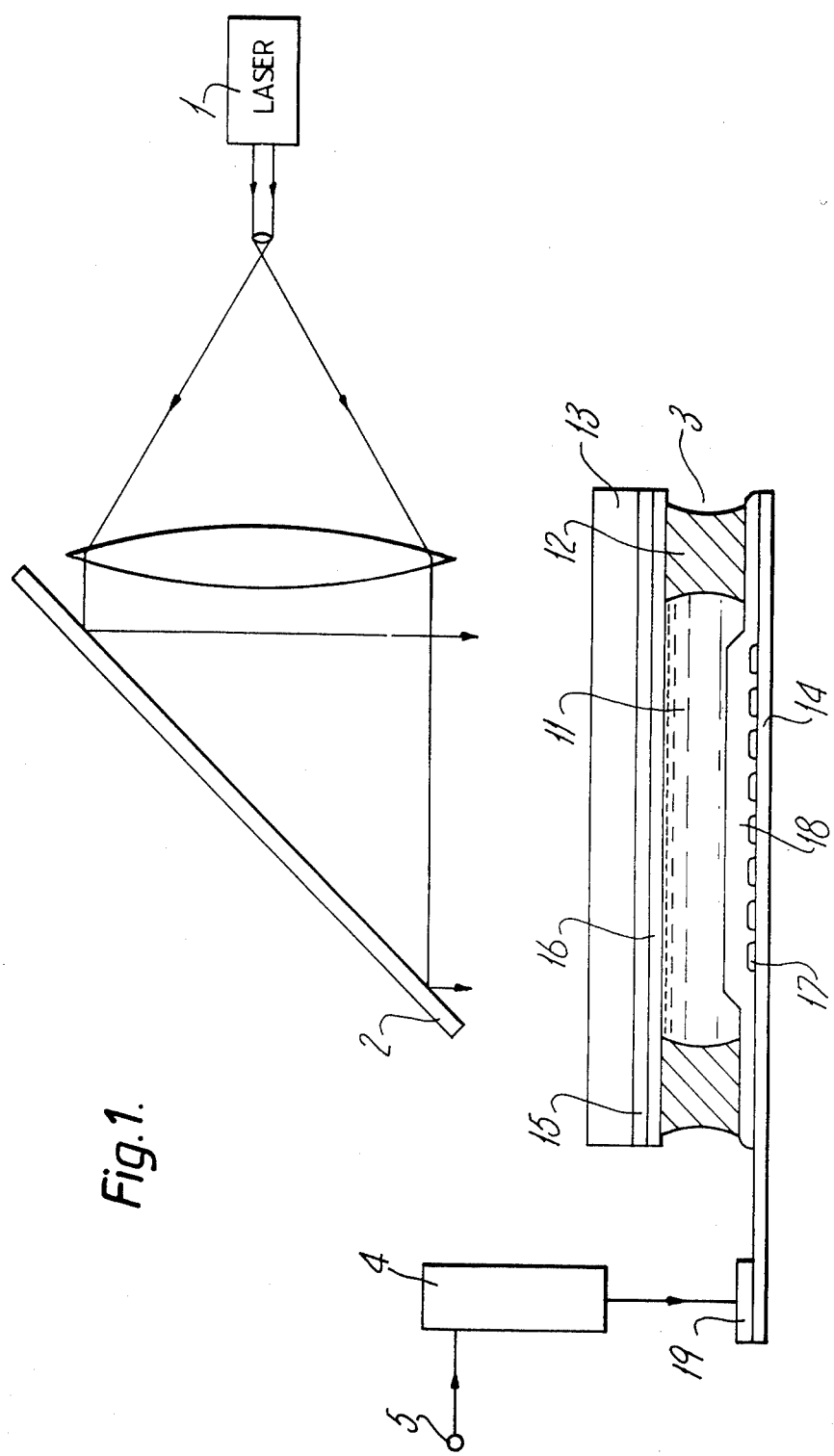
FIG. 1 is a schematic diagram of the image generator.

Referring now to the drawing in detail, and first to FIG. 1 thereof, it may be seen that it depicts a coherent light generator which includes as its basic components a laser 1, a beam splitter 2, a liquid crystal display cell 3, and an electronic drive circuitry 4 for processing a video signal at input 5 into a suitable form for application to the liquid crystal cell 3.

The liquid crystal display cell operates in a reflective mode and is addressed on a matrix basis via an active semiconductor backing layer 14. This layer 14 includes at least one transistor for each matrix point. Suitable matrices of such transistors can be made, for instance, using the technology of forming thin film transistors on glass substrates (TFT), of forming silicon based transistors on sapphire substrates (SOS), or of forming silicon transistors on standard single crystal silicon wafers (SCS). Having regard to the current state of art in these technologies and to the large number of devices required for a matrix, it is preferred to use the single crystal silicon (SCS) technology. Similar reasoning also lead to the choice of NMOS technology.

The generally preferred type of liquid crystal display mode for this application is one involving the use of a dichroic dye in some form of guest-host interaction. An advantage of using a guest-host interaction is that it is able to produce amplitude modulation directly. In some circumstances, however, it may be preferable to rely instead upon a birefringence mode of operation which produces polarization modulation which is subsequently converted to amplitude modulation by means of suitable polarization analysis such as is used, for instance, in the 'light valve' referred to previously. It is believed that in some circumstances the avoidance of a dye and the consequent need to rely instead upon birefringence effects can facilitate the accurate rendering of multi-level gray-scales.

Several different electro-optic liquid crystal effects involving pleochroic dyes are possible for a display cell operating in the reflective mode. These include the dyed nematic without front polarizer, the dyed nematic with front polarizer, and the dyed cholesteric-nematic phase change modes of operation. If the display is illuminated with unpolarized light, the dyed cholesteric-nematic phase change mode of operation may be preferred to a dyed nematic mode because the former offers reasonably high brightness and reasonably good contrast, whereas a dyed nematic offers high brightness but poor contrast when used without a front polarizer, and good contrast but poor brightness when used with a front polarizer. The poor contrast in the absence of the polarizer arises because only one of the two principal planes of polarization of light through the liquid crystal is subject to absorption by the dye, and thus with unpolarized light about half the light is transmitted through the layer unchanged. When a polarizer is used, this problem is avoided by filtering out the polarization that is not attenuated by the dye. This gives good contrast, but a heavy penalty is paid in terms of brightness due to the absorption of light in the polarizer.

The situation is slightly different in the present instance since most lasers emit plane polarized light. Therefore, taking into account the fact that a typical phase-change cell has an optical transfer characteristic (optical response versus voltage curve) that exhibits a pronounced hysteresis that inhibits gray-scale representations, it is generally preferred to use the dyed nematic mode for coherent light image generation. Such a dyed nematic cell may contain a small amount of chiral additive provided to shorten the switching off time, and possibly also to avoid problems of reverse twist. Only in an application in which the laser illumination is not very bright and is not polarized is the dyed phase-change mode likely to be preferable to the dyed nematic mode, in which case it is possible to reduce the hysteresis problem by reducing the concentration of the chiral additive. Continued to the limit, such a reduction converts the cell into a dyed nematic, but before this is reached there is a trade-off point at which the hysteresis is reduced by an acceptable amount without occasioning too much reduction in contrast. Typically this will occur when the reduction in chiral additive has increased the cholesteric pitch from being between a third and a fifth of the liquid crystal layer thickness to being just greater than the layer thickness.

Referring again to FIG. 1, the liquid crystal display cell 3 is a dyed nematic cell on NMOS processed active single crystal silicon, and is constructed by forming an envelope for a layer 11 of liquid crystal by sealing together with an edge seal 12 a glass sheet 13 and the backing layer 14 which is preferably a four inch diameter single crystal wafer of silicon. The edge seal 12 may be a plastics seal, thereby avoiding some of the liquid crystal molecular alignment problems associated with the use of high temperatures used in the provision of fused glass frit edge seals. The glass sheet 13 is provided with an internal transparent electrode layer 15 which is covered with a transparent insulating layer 16 designed to prevent the passage of direct current through the cell 3. The silicon wafer 14 is provided with a matrix array of separate metal electrode pads 17, defining individual picture elements (pels) of the display. With the pads 17 measuring 0.25 mm square, it is possible to make a display with a 240 by 240 matrix. Greater resolution can be obtained by going to smaller pads. (The additional constraints that this imposes will be referred to later.) The matrix array of pads 17 is similarly covered with a transparent insulating layer 18. The exposed surfaces of the two insulating layers 16 and 18 are treated to promote parallel homogeneous alignment of the molecules of the adjacent liquid crystal layer 11 in the absence of any disturbing applied field. This treatment may be provided for instance by an oblique evaporation of silicon monoxide. Within the area defined by the edge seal 12, the silicon wafer 14 is held spaced a precise distance from the glass sheet 13 by means of short lengths of glass fiber (not shown) trapped between the two adjacent surfaces so as to provide the liquid crystal layer 11 with a uniform thickness of typically 5 to 15 microns, ±1 micron. To achieve this uniformity, it is generally necessary for the silicon or the glass or both to be sufficiently pliable to enable the surface contour of one of the confining surfaces to conform to that of the other. When using an unbacked silicon wafer 14, it is this wafer 14 that does at least the majority of the conforming, and this is relatively easy to achieve provided that steps are taken to ensure that the unstressed silicon wafer 14 tends to bow inwards (to trap the fiber spacers) rather than outwards, and that clamping jigs, used to hold the assembly while the edge seal 12 is being made, do not exert too much pressure and crush the fibers. Beyond the confines of the edge seal 12 the silicon wafer 14 is provided with a small number of pads 19 by which external electrical connections may be made with the circuitry contained within the wafer 14.

A particular pel is driven into a partially or fully 'ON' state by applying a potential to its pad 17 that is different from the potential applied to the front electrode 15. Each pad 17 is connected to the output of a MOSFET switch formed in the wafer 14 so that, when the FET is conducting, the pad 17 can be charged to the appropriate potential relative to that of the front electrode 15 to activate the liquid crystal pel to the requisite extent. All the pels of a line of the matrix are addressed at the same time, and then the FET's associated with those pels are turned off to isolate those pads 17 while those of other lines of the array are being addressed. The pads 17 of the first-mentioned line are recharged after a complete cycle, and it is necessary to ensure that any leakage of charge away from the pad 17 in the interval between successive chargings is not excessive, having regard to the capacitance associated with that pad 17. Part of this leakage will be through the liquid crystal layer 11, and part through the turned-off FET, while the capacitance is directly related to the size of the pad 17.

Figure 2:
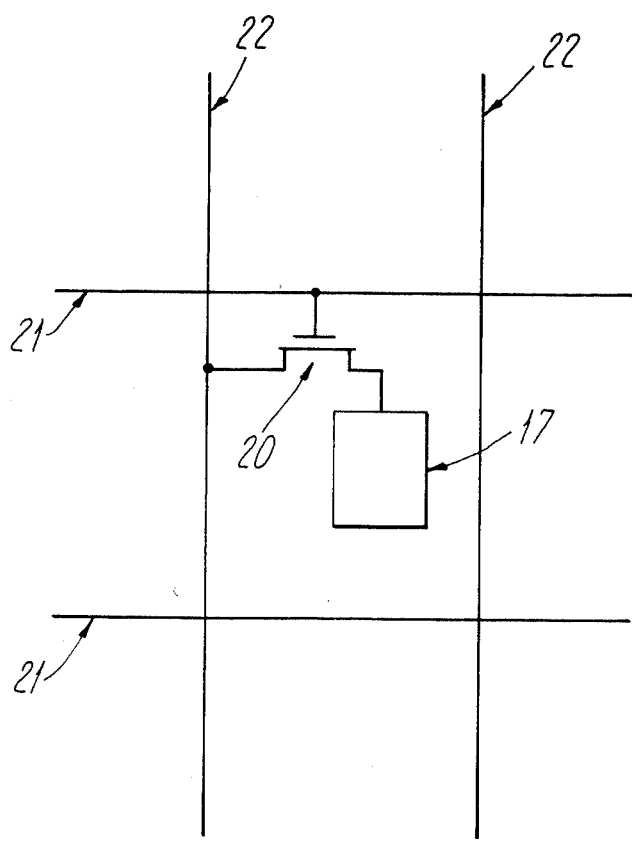
FIG. 2 depicts the basic picture element circuit of image generator liquid crystal cell.

The arrangement of an FET in relation to its associated pad 17 and access lines is diagrammatically represented in FIG. 2. Each pel pad 17 is connected to the drain of its associated FET 20 whose gate and source are respectively connected to the associated row and column access lines 21 and 22, appropriate to the position of that pel pad 17 in the display matrix. The display is written line by line, with the data appropriate to each line being applied in turn to the column access lines (source lines) 22, while the row access lines (gate lines) 21 are strobed.

In choosing how to make the access lines 21 and 22, it is important to have regard to electrical rise times, power consumption, and yield in manufacture. Three types of conductors were considered for this particular embodiment: metal, polysilicon, or diffusion. Metal lines have the shortest rise times (typical resistance is 0.03 ohms per square, and capacitance about $2 \times 10^{-5}$ $Fm^{-2}$), followed by polysilicon lines (resistance 20–50 ohms per square, and capacitance about $5 \times 10^{-5}$ $Fm^{-2}$). Diffusion lines have lower resistance (about 10 ohms per square), but higher capacitance (about $3.2 \times 10^{-4} Fm^{-2}$). The source lines 22 generally require the shorter rise times, particularly if the display addressing mode calls for all pels to be simultaneously blanked, and hence it is preferred to make them of metal throughout, and to make the gate lines 21 of metal except at the crossovers, where diffusions are used.

As explained previously, electrically insulating layers 16 and 18 have been provided in order to prevent the degradation of the liquid crystal layer 11 by electrolytic effects, and therefore the pels must be driven by an alternating field. In the current state of technology, the voltage swing available from an NMOS silicon wafer is less than the peak-to-peak square wave voltage required to drive a conventional phase-change type liquid crystal layer in which the concentration of chiral additive is great enough to provide a cholesteric pitch significantly shorter than the liquid crystal layer thickness. This means that with this type of electro-optic effect it is necessary to apply an alternating voltage to the front electrode 15 in antiphase with that applied to the pads 17. This in turn imposes limitations upon the way the matrix must be scanned in order to minimize the appearance of residual 'ON' voltages at those pels that are nominally 'OFF'. This problem, and way of overcoming it, is discussed in the specification of U.S. patent application Ser. No. 270,424, filed June 4, 1981, entitled "Liquid Crystal Display Device", assigned to International Standard Electric Corporation, the assignee of the instant application, to which attention is directed for further details.

Dyed nematic and dyed phase-change cells with minimal chiral additive providing a pitch equal to or greater than the liquid crystal layer thickness have the advantage that they can be driven by lower voltages permitting an addressing scheme in which the front electrode 15 is held at a constant potential. This permits a relatively simple addressing scheme in which the pads 17 are driven positive with respect to the front electrode 15 for one field of the input data video signal, and negative for the next. This is satisfactory provided that leakage effects do not give rise to excessive voltage drop between consecutive addressings of each pel.

Figure 3:
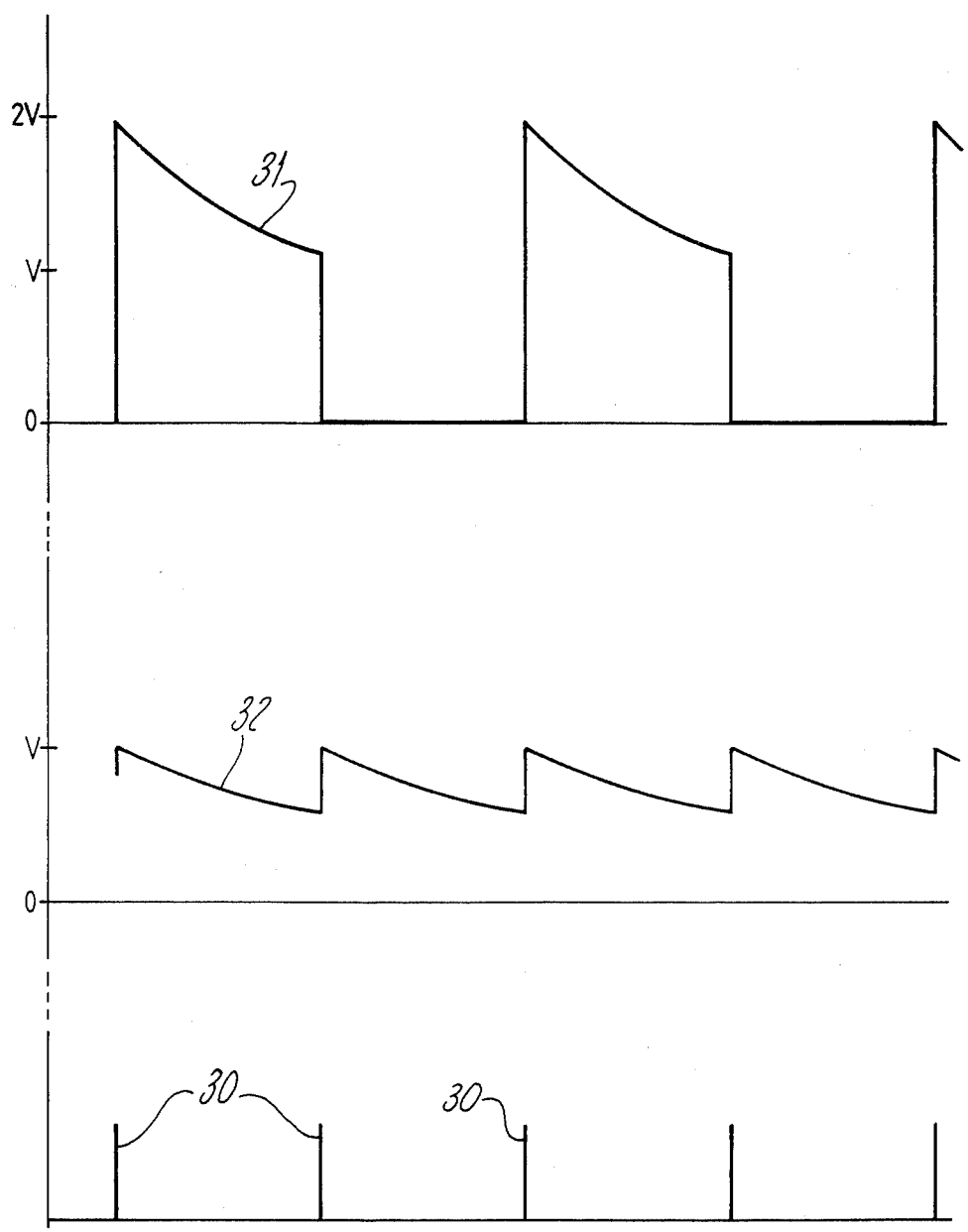
FIGS. 3, 4 and 5 show waveforms of alternative drive systems for the liquid crystal cell.

The problems arising from voltage drop can be readily appreciated from an examination of FIG. 3, which models a drive system in which the front electrode 15 is held at a voltage V while the voltage applied to a fully 'ON' pad 17 alternates beween 2 V and 0 volts. These voltages are applied to the pad 17 by short duration pulses 30 that momentarily open the gate of the associated FET 20. The repetition frequency of these pulses is set by the video signal and is typically 50 Hz. FIG. 3 depicts a situation where leakage provides a time constant that is short compared with the interval between the consecutive pulses 30. The voltage waveform 31 of an 'ON' pad 17 is asymmetrical about the front electrode potential, and hence the integrity of the electrically insulating layers 16 and 18 is seen to be important. The voltage waveform 32 of an 'OFF' pad 17 is also asymmetrical about the front electrode potential, and hence the 'OFF' pels see an unwanted residual drive waveform. If the time constant is the same for all pels across the whole display this problem can be simply resolved by the choice of an appropriate offset voltage. In practice, however, transistor leakage is generally found to vary significantly over the surface of a wafer, and hence this simple approach to the problem will not achieve the desired result in situations in which transistor leakage is the dominant factor determining the time constant.

The time constant of a pel is governed by the capacitance between the pad 17 and the silicon wafer 14, and that between the pad 17 and the front electrode 15. The associated leakage resistance is made up of the leakage resistance through the thickness of the liquid crystal layer 11 and the leakage resistance of the transistor 20. As the pel size is reduced, it is found that initially there is little effect upon the time constant since the total leakage is dominated by the liquid crystal leakage, and this leakage decreases with the size of the pad 17 at the same rate as the reduction in capacitance. Eventually, however, the transistor leakage becomes significant in relation to the liquid crystal leakage, and at some pel size, typically below 100 microns square, the performance of the matrix starts to depend critically on the leakage resistance of the transistors 20. For this reason it is generally desirable to use a matrix whose pel pads 17 are at least as large as possible, consistent with the resolution requirements imposed by the particular application for which the cell 3 is designed.

Figure 4:
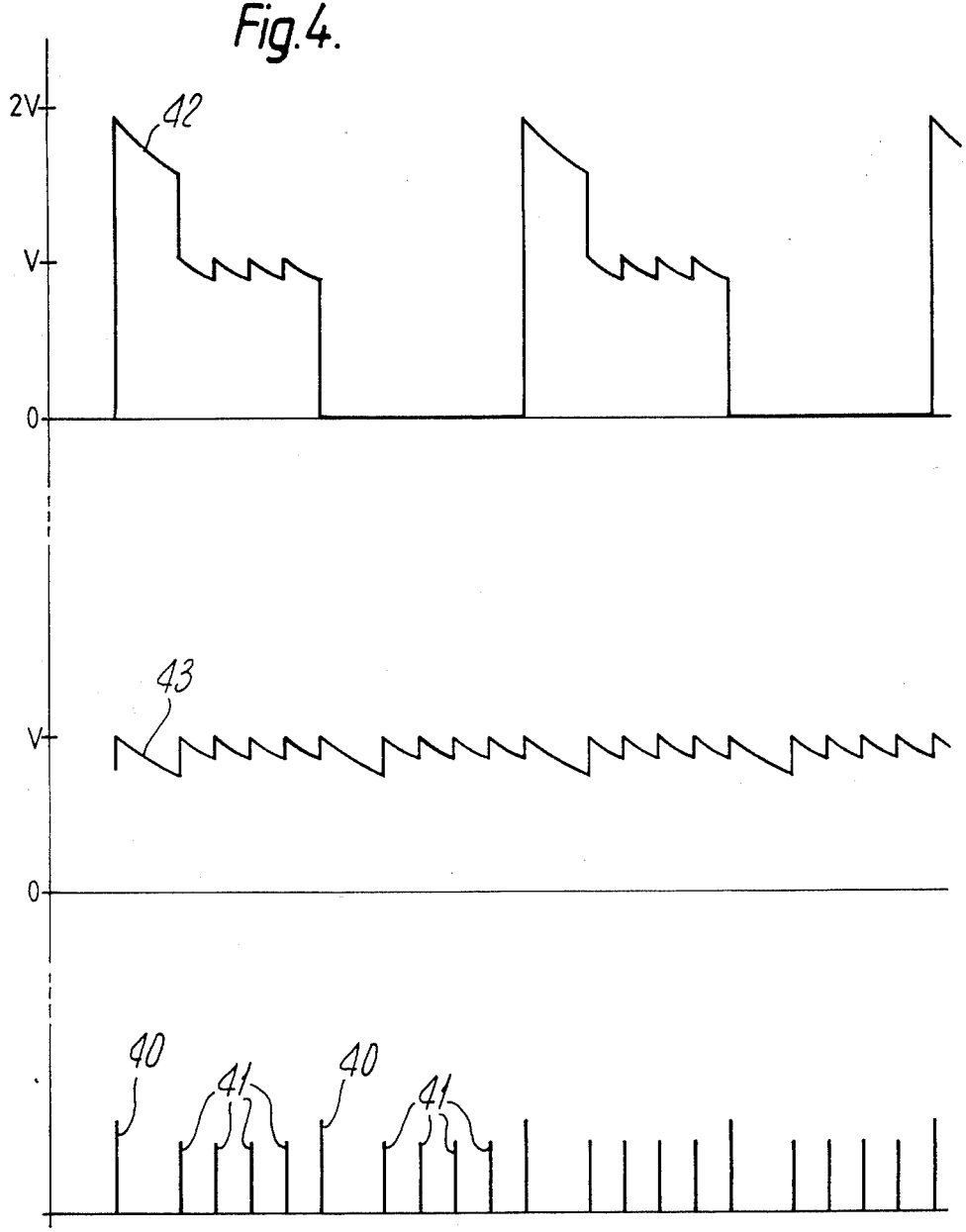

One way of reducing the significance of variation in transistor leakage in displays with small pels is to adopt a drive scheme as depicted in FIG. 4. The same voltages are used as have been described with reference to the FIG. 3 drive scheme, but in this instance the waveform applied to the gate of the FET 20 associated with the pad 17 consists of a train of data pulses 40 interspersed with a succession of blanking pulses 41. Typically the first blanking pulse occurs about a third of a frame period after the data pulse. The resulting 'ON' and 'OFF' voltage waveforms are depicted respectively by waveforms 42 and 43. In this way the voltage droop seen by fully 'ON' pels is reduced, and more importantly, the proportional difference in rms voltage seen by high leakage and low leakage pels is reduced. Similarly the voltage seen by 'OFF' pels is also reduced. The disadvantage of this drive scheme is that it results in a reduced rms voltage seen by 'ON' pels for a given voltage swing, but this may be less significant than the reduction in disparity of appearance of nominally equally affected 'ON' pels. The time interval between addressing and first blanking will normally be less than half the time interval between consecutive addressings for the blanking to have any significant effect upon the problems of voltage drop, thereby reducing the rms voltage by a factor of at least 2.

Figure 5:
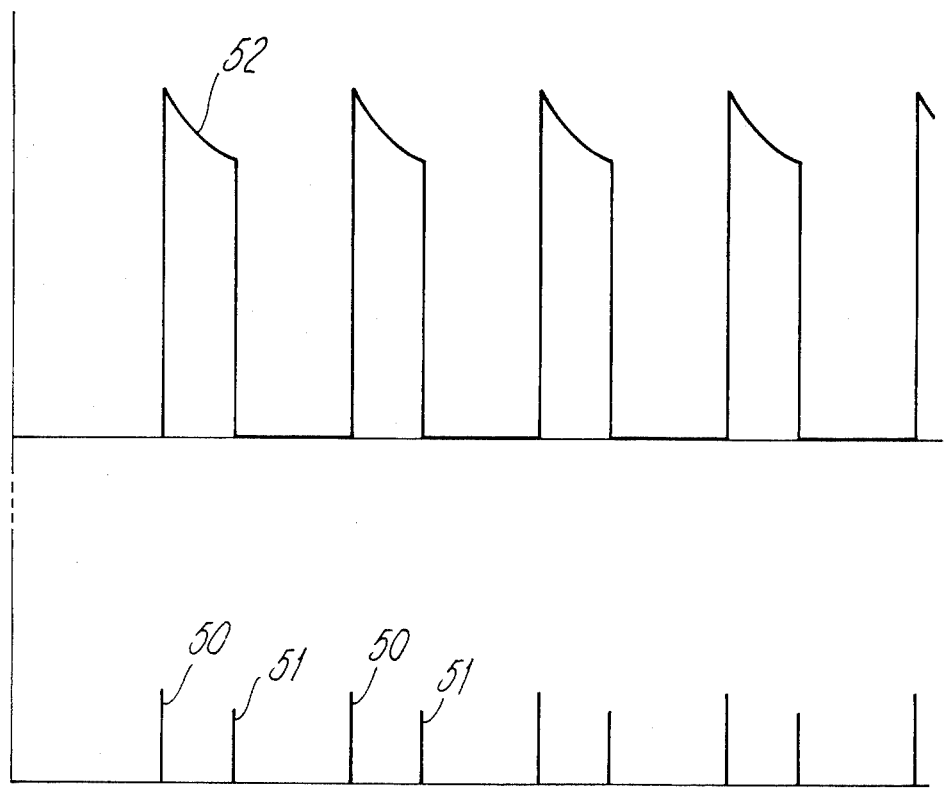

The residual voltage seen by the 'OFF' pels can be totally eliminated by adopting the drive scheme depicted in FIG. 5. In this instance the front electrode is maintained at 0 volts. A data pulse 50 opens the FET 20, and, in the case of a fully 'ON' pel causes the pad 17 to be taken to the full voltage of 2 V volts. After a predetermined interval, typically equal to a third of the frame period or less, a blanking pulse 51 restores the pad 17 to 0 volts, producing the waveform 52. In this instance only one blanking pulse is required between each pair of consecutive data pulses. The data pulse for a fully 'OFF' pel keeps the voltage of the pad 17 at 0 volts, and the blanking pulse leaves its voltage unchanged. The advantage of this scheme is that the rms voltage seen by an 'OFF' pel is truly zero whatever the leakage situation. A disadvantage is that there is always a significant dc component to the drive applied to 'ON' pels, and hence the insulating layers 16 and 18 which serve to block dc must be of high integrity.

Figure 6:
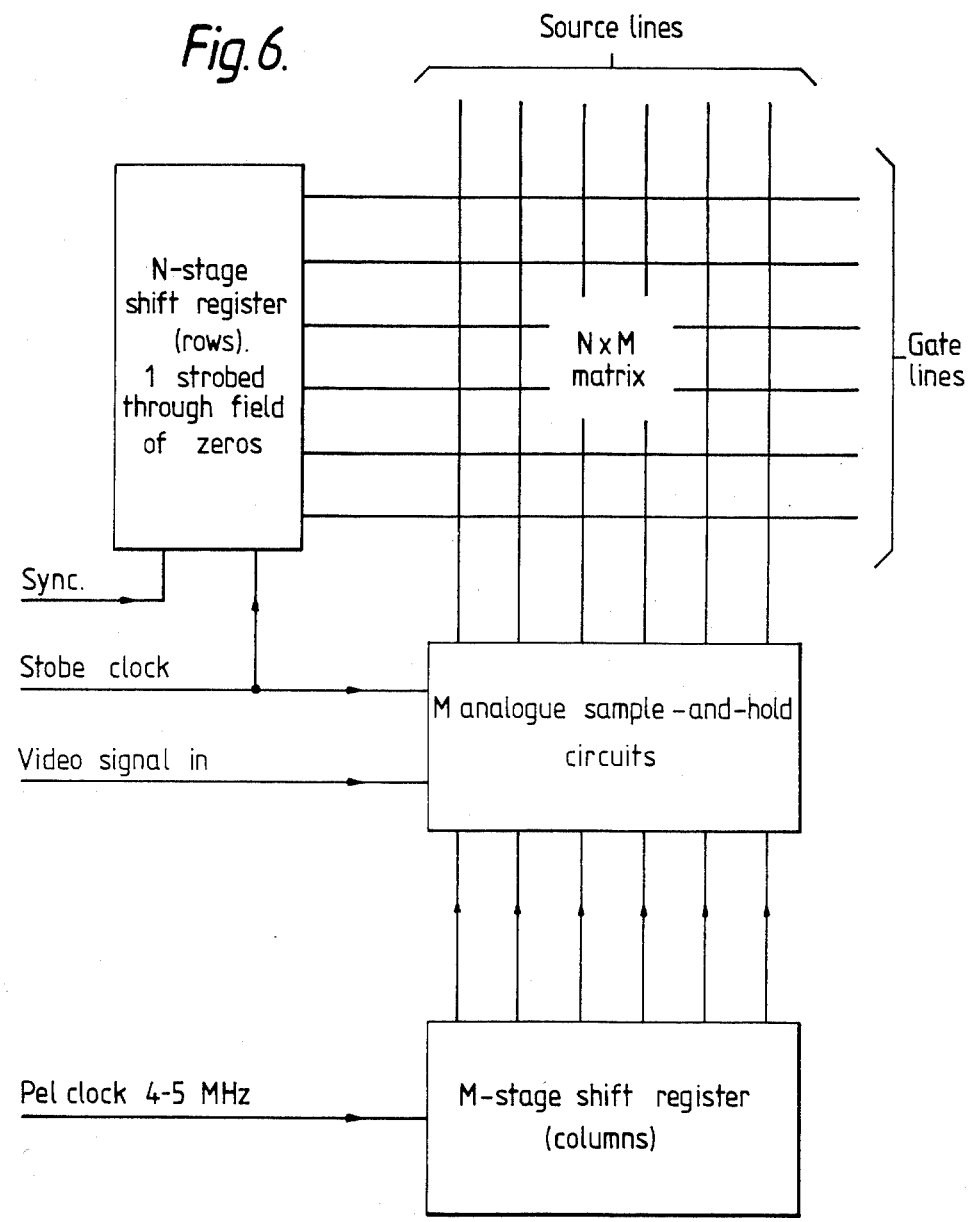
FIG. 6 is a schematic of the on-wafer circuitry of the liquid crystal cell.

One of the features of using a silicon wafer 14 to back the liquid crystal layer 11 is that the borders of the wafer 14 beyond the confines of the display area are conveniently used for the fabrication of access circuitry designed to reduce the number of external connections that need to be made with the wafer 14. FIG. 6 is a schematic of on-wafer circuitry used to reduce these connections to a manageable number. It will be seen that the source and gate lines of the matrix are each accessed by the circuitry from one end only, and hence it is possible to duplicate the access circuitry, using a mirror image layout around the two unused sides of the array. It will be appreciated that the display calls for the correct functioning of a very large number of active devices in the wafer 14, and this duplication provides a measure of redundancy that improves the manufacturing yield of acceptable wafers 14. A wafer 14 with this redundancy may be tested before assembly to select which part of the access circuitry to use, and which to disable.

It may be noted that for this particular application the display is preferably specularly reflecting. The reflection is conveniently provided by the material of the pel pads 17, and it is found that conventional metallization used in standard MOS technology provides acceptable reflecting properties, and hence entirely standard MOS manufacturing processes are used in the manufacture of the wafer 14 right up to the provision of the molecular alignment treatment required for achieving the requisite orientation of the liquid crystal molecules at the adjacent surface of the liquid crystal layer 11.

When the cell 3 has been assembled, it is vacuum filled via an aperture formed by a break (not shown) in the edge seal 12. Once the enclosure has been filled the aperture is sealed off by a suitable plug.

An example of a suitable liquid crystal filling is the nematic guest-host mixture marketed by BDH under the designation D86 (black dye) in host E63. To this may be added a small quantity of chiral additive, typically the cyano-biphenyl marketed by BDH under the designation CB15. Normally this will be added in a proportion that keeps the cholesteric pitch greater than the thickness of the liquid crystal layer so as to avoid introducing excessive hysteresis in the optical transfer characteristic of the mixture.

While we have described above the principles of our invention in connection with a specific arrangement, it is to be clearly understood that this description is made only by way of example and not as a limitation to the scope of our invention as set forth in the objects thereof and in the accompanying claims.

We claim:

1. A coherent light imaging arrangement comprising: means for generating a coherent light image, including,
    at least one reflective mode liquid crystal display cell having a liquid crystal layer that is sandwiched between an electroded transparent front plate and a backing plate which includes a semiconductor layer provided with a matrix array of semiconductor gates and a matrix array of reflective electrodes situated at said liquid crystal layer to define respective picture elements in the latter and individually connected to said gates to be addressed thereby, and
    a laser operative for directing coherent radiation on said reflective mode liquid crystal display cell; and
  means for driving said generating means, including
    a drive circuitry connected with said gates and operative for so processing an input video signal as to modulate the optical properties of selected ones of said picture elements in dependence on their positions by developing a selected electric field distribution between the electroded front plate and the individual electrodes of the backing plate in accordance with the information contents of said input video signal, said drive circuitry being operative for repetitively addressing each of the reflective electrodes of the matrix array via the associated gate, and, after each addressing, to close the gate for a predetermined period, and then reopen at least once to discharge a reflective electrode and reclose the gate before refreshing said reflective electrode with its next addressing with data.

2. The coherent light image generating arrangement as defined in claim 1, wherein said display cell is a dyed nematic cell.

3. The coherent light image generating arrangement as defined in claim 1, wherein said display cell is a dyed phase-change cell.

4. The coherent light image generating arrangement as defined in claim 1, wherein said cell includes a cholesteric liquid crystal layer and the pitch of said cholesteric liquid crystal layer of the cell is greater than the thickness of said liquid crystal layer.

5. The coherent light image generating arrangement as defined in claim 1, wherein said display cell is a dye-free variable birefrigence effect liquid crystal cell.

6. The coherent light image generator as claimed in claim 1, wherein said semiconductor layer is a single crystal silicon wafer.

7. The coherent light image generator as claimed in claim 6, wherein said wafer is an NMOS wafer.

8. A coherent light image generating arrangement as defined in claim 1 wherein the drive circuitry is adapted to discharge each reflective electrode at a predetermined period of time after it has been addressed, said predetermined period of time being less than half the time interval between consecutive addressings of the same electrode.

9. The coherent light image generating arrangement as defined in claim 1, and further comprising electro-optic signal processing means including a holographic filter and operative for forming a coherent light image of the input video signal and superimposing the Fourier transform of said image on said holographic filter.

10. The coherent light image generating arrangement as defined in claim 1 for use with a television camera with a limited field of view, and further comprising means for identifying the presence and location of a particular object in the field of view, including means for supplying the video signal from the television camera to said driving means to cause said generating means to form a coherent light image of the field of view, and cross-correlating means operative for superimposing a Fourier transform of said image on a hologram representative of said particular object.

11. The coherent light image generating arrangement as defined in claim 1, further comprising additional generating and driving means of the same type as said generating and driving means, each of said driving means processing a different input video signal so that said generating means and said additional generating means display different coherent light images; and further comprising signal processing means operative for forming Fourier transforms of said different coherent light images, and for superimposing said Fourier transforms with one another.

12. The coherent light image generating arrangement as defined in claim 1 for use with a television camera having a limited field of view, further comprising additional generating and driving means of the same type as said generating and driving means, each of said driving means processing a different input video signal so that said generating means and said additional generating means display different images one of which is an image of the field of view and the other is an image representative of a particular target object the presence and location in the field of view is to be established; and further comprising means for cross-correlating the coherent light images, including means for forming Fourier transforms of said coherent light images, and means for superimposing one of said Fourier transforms upon the other.

* * * * *